: (12) United States Patent
Dvorkin et al.

(10) Patent No.: US 9,003,001 B2
(45) Date of Patent: Apr. 7, 2015

(54) BIOS PARAMETER VIRTUALIZATION VIA BIOS CONFIGURATION PROFILES

(75) Inventors: Michael V. Dvorkin, Redwood City, CA (US); Tao Wang, Cupertino, CA (US); Dmitry Barsky, San Jose, CA (US); Krishna Mohan, Fremont, CA (US); Chidananda Satya Kumar Patchava, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 598 days.

(21) Appl. No.: 12/832,529

(22) Filed: Jul. 8, 2010

(65) Prior Publication Data

US 2011/0225274 A1  Sep. 15, 2011

Related U.S. Application Data

(60) Provisional application No. 61/314,122, filed on Mar. 15, 2010.

(51) Int. Cl.
*G06F 15/177* (2006.01)
*G06F 15/173* (2006.01)
*G06F 9/445* (2006.01)

(52) U.S. Cl.
CPC ............ *G06F 9/445* (2013.01); *G06F 9/44505* (2013.01)

(58) Field of Classification Search
CPC .......... H04L 41/00; H04L 43/50; H04L 12/24
USPC .................................................. 709/221–223
See application file for complete search history.

(56) References Cited

U.S. PATENT DOCUMENTS

| 6,732,267 | B1 * | 5/2004 | Wu et al. ......................... 713/100 |
| 7,203,831 | B2 * | 4/2007 | Wu et al. ......................... 713/100 |
| 7,698,546 | B2 * | 4/2010 | Stemen ........................... 709/223 |
| 7,904,708 | B2 * | 3/2011 | Harmer ........................... 709/221 |
| 2005/0198203 | A1 * | 9/2005 | Tsai et al. ...................... 709/218 |
| 2005/0216911 | A1 * | 9/2005 | Yen et al. ....................... 717/176 |
| 2006/0085628 | A1 * | 4/2006 | Brcin et al. ....................... 713/1 |
| 2009/0158021 | A1 * | 6/2009 | Joshi et al. ......................... 713/2 |
| 2009/0177877 | A1 | 7/2009 | Holdaway et al. |
| 2010/0277487 | A1 * | 11/2010 | Gillespie ......................... 345/520 |

OTHER PUBLICATIONS

International search report for application No. PCT/US2011/028223 dated Jul. 7, 2011.

* cited by examiner

*Primary Examiner* — Minh-Chau Nguyen
(74) *Attorney, Agent, or Firm* — Patterson + Sheridan, LLP

(57) ABSTRACT

Techniques presented herein provide approaches for generating a markup language object that describes a variety of BIOS setup variables and which allow the markup language object to be passed to the management system, as well as allow retrieval of a normalized BIOS from the management system. Doing so allows the management system to be used to easily and efficiently control a large number of server systems within a data center.

17 Claims, 6 Drawing Sheets

```xml
<?xml version='1.0' ?>
<bios-params>
    ...
    <InterruptRemap value='Disabled' />
    <CoherencySupport value='Disabled' />
    <ATS value='Disabled' />
    <PassThroughDMA value='Enabled' />
    <HardwarePrefetch value='Enabled' />
    <AdjacentCacheLinePrefetch value='Enabled' />
    <DirectCacheAccess value='Enabled' />
    <SelectMemoryRAS value='Maximum Performnace' />
    <NUMAOptimize value='Enabled' />
    <IntelSASRaidConfig value='Enabled' />
    <ConfigSASRaidModule value='IT/IR RAID' />
    <OnboardSATA value='Enabled' />
    <ConfigSATAMode value='Enhanced' />
    <Serial-PortA value='Enabled' />
    <SerialPortAAddress value='3F8h' />
    <SerialPortAIRQ value='4' />
    <USBController value='Enabled' />
    <MaxMemoryBelow4GB value='Enabled' />
    ...
</bios-params>
```

FIG. 6

BIOS PARAMETER VIRTUALIZATION VIA BIOS CONFIGURATION PROFILES

CROSS-REFERENCE TO RELATED APPLICATION

This application claims benefit of U.S. Provisional Patent Application Ser. No. 61/314,122 filed Mar. 15, 2010, which is incorporated herein by reference.

TECHNICAL FIELD

Embodiments presented in this disclosure generally relate to relate to techniques for updating and managing basic input/output system (BIOS) settings in a computer system, and more particularly, to techniques for BIOS parameter virtualization via BIOS configuration profiles.

BACKGROUND

As the number of computer servers used by businesses has substantially increased, a number of techniques have been developed to remotely manage the operation of such servers. For example, large data centers are frequently managed using a variety of different remote management tools, including e.g., simple terminal connections, remote desktop applications and sophisticated software tools used to configure, monitor, and troubleshoot both computer hardware and software. The remote management tools are often configured to communicate using standardized protocols such as Server Management Architecture for Server Hardware (SMASH) Intelligent Platform Management Interface (IPMI), etc.

Computer systems include a BIOS, which stores firmware executed when a PC is first powered on along with a set of configuration settings specified for BIOS parameters. The BIOS typically recognizes, initializes, and tests the hardware present in a given computing system based on the set of configuration settings. Once the BIOS operations are complete, the BIOS turns over control of a computing system to an operating system (e.g., by running an operating system (OS) boot loader specified using a BIOS parameter value). Additionally, the BIOS provides an interface that allows a variety of different parameters to be set. For example, the BIOS may be used to specify clock and bus speeds, specify what peripherals are attached to a computing system, specify monitoring and "health" settings (e.g., fan speeds and CPU temperature limits), as well as specify a variety of other parameters that can effect the overall performance of a computing system. The BIOS firmware and BIOS parameter settings are stored in a non-volatile memory on the computer system.

Currently, however, much of BIOS behavior is not controlled by server management tools and many server BIOS settings and, consequently, server sub-system behavior is defined based on individual server BIOS settings without considering the overall data center environment. For example, BIOS configuration is not automated, and as a result, BIOS parameter settings on computer systems within a data center are frequently managed on a one-off basis where the configuration settings specified for BIOS parameters are set individually on each computing system.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 6 is an example list of normalized BIOS parameters, according to certain embodiments of the present disclosure.

DESCRIPTION

Overview

Figure 1:
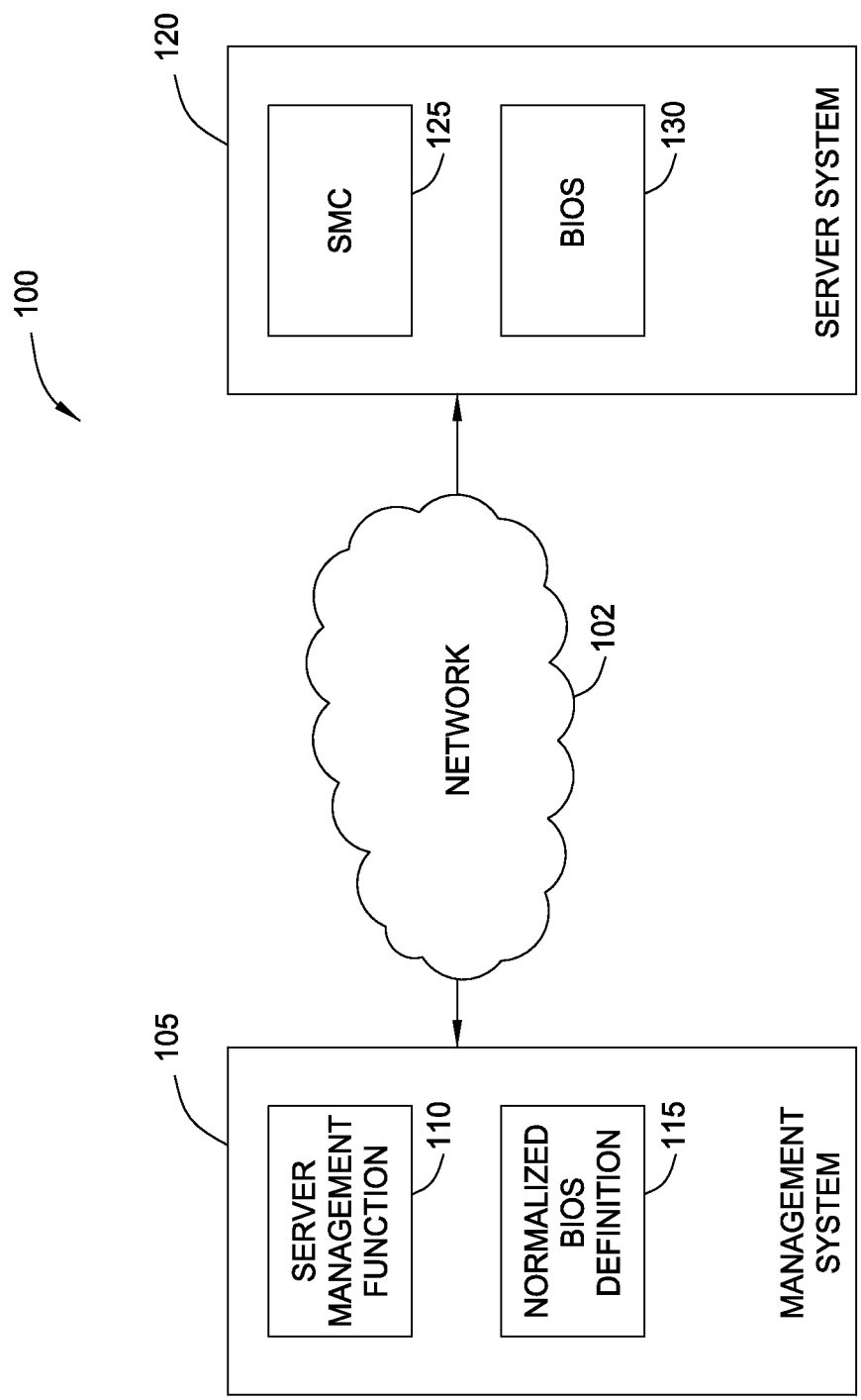
FIG. 1 is a block diagram illustrating a management system configured to manage a BIOS on a computer system using normalized BIOS parameters and BIOS configuration profiles, according to certain embodiments of the present disclosure.

One embodiment described herein includes a method for managing a BIOS parameter on a remote computer system. The method may generally include receiving, over a data communications network, a normalized BIOS parameter setting to be applied to the BIOS on the remote computing system. The method may also include translating the normalized BIOS parameter setting into an actual BIOS parameter setting applicable for a BIOS on the remote computing system, and storing the actual BIOS parameter setting in the BIOS on the remote computing system. Once the remote computer system is rebooted, the actual BIOS parameter setting to the operation of the rebooted computer system.

Another embodiment described herein includes a method for configuring a BIOS on a remote computing system. This method may generally include receiving, over a data communications network, a BIOS profile, wherein the BIOS profile describes a plurality of normalized BIOS parameter settings to be applied to the BIOS on the remote computing system. This method may also include translating each of the normalized BIOS parameter settings into a respective actual BIOS parameter setting applicable for the BIOS on the remote computing system and storing the actual BIOS parameter settings in the BIOS on the remote computing system.

In a particular embodiment, the BIOS profile may be associated with a software application (or application stack). In such a case, the plurality of BIOS parameter settings described by the BIOS profile may be use to optimize the configuration of the computing system for executing the software application.

Still another embodiment described herein includes a computer-readable storage medium containing a program, which, when executed on a processor, performs an operation for managing BIOS parameter settings on a remote computing system. The operation itself may generally include receiving a normalized BIOS parameter setting to be applied to the remote computing system and transmitting, over a data communications network, the normalized BIOS parameter setting to the remote computing system. The remote computing system may itself be generally configured to receive the normalized BIOS parameter setting, translate the normalized BIOS parameter setting into an actual BIOS parameter setting applicable for a BIOS on the remote computing system, and store the actual BIOS parameter setting in the BIOS on the remote computing system.

Yet another embodiment of the disclosure includes a computing system. The system may include a processor, a memory, a BIOS having a plurality of BIOS parameters and respective BIOS settings. The computing system may be configured to perform an operation for managing the plurality of BIOS parameter settings. The operation itself may generally include receiving, over a data communications network, a normalized BIOS parameter setting to be applied to one of the BIOS parameters and translating the normalized BIOS parameter setting into a corresponding one of the plurality of BIOS parameters. The operation may also include storing the corresponding BIOS parameter setting in the BIOS on the computing system.

DESCRIPTION OF EXAMPLE EMBODIMENTS

Embodiments described herein present techniques for managing BIOS parameters on a physical computing system, both individually and on the basis of a BIOS configuration profile. In one embodiment, a markup language grammar, e.g., extensible markup language (XML) may be used to define a normalized description of BIOS parameters applicable for a broad variety of underlying computing system hardware. Of course, other approaches may be used for defining a normalized BIOS definition/description as well as for communicating such BIOS settings to a computer system in a data center (e.g., the Systems Management Architecture for Server Hardware (SMASH) specifications or the Intelligent Platform Management Interface (IPMI) specification).

In one embodiment, the normalized BIOS description includes a set of BIOS settings. The normalized or abstracted view of a BIOS provided by the normalized BIOS description allows a user to manage BIOS settings on a remote computing system (e.g., for managing a server within a data center). That is, the normalized BIOS description provides an abstraction of a computer BIOS. The normalized BIOS description may map to concrete settings in an actual BIOS. For example, once the abstraction of a BIOS created by the normalized BIOS description is defined, a user may interact with a management system to specify a setting for an actual BIOS parameter on the remote computing system. However, the setting for the BIOS parameter may be based on the normalized BIOS description, i.e., based on the abstraction. Once specified, the management system may transmit the specified BIOS value to the remote computing system. In one embodiment, a server management controller (SMC) on the remote computing system receives the message with the normalized BIOS parameter and passes it to the BIOS on the remote computing system. In turn, the BIOS determines a corresponding actual parameter setting for that system, and updates the BIOS on that system accordingly. Thereafter, when the computing system is rebooted, the updated BIOS settings are applied or otherwise take effect. The SMC provides a controller used to manage a variety of functions on a computing system. One example of an SMC is a baseboard management controller (BMC) available on many server system boards. Another example includes a lights out management system.

Additionally, in one embodiment, the management system may use a BIOS profile to configure multiple BIOS settings at once. The BIOS profile may specify a collection of BIOS settings, formatted using the normalized BIOS definition. Further, the BIOS profile may be bound to a server "personality" profile or a particular application stack. For example, if a user wishes to configure a server within a data center to host a database application, a corresponding BIOS profile may store a set of BIOS parameter values selected to optimize database operations (specified using the normalized BIOS). Such a profile may be transmitted to the SMC on the server system and passed to the BIOS. The BIOS then translates the virtualized settings specified in the profile and updates the BIOS on that server accordingly. A BIOS profile associated with a given application stack may be integrated as part of (or referenced by) a description of that application stack.

Further, the virtualization of the BIOS settings a user to include the BIOS configuration of a given computing system when moving an application (or application stack) from one physical computing system to another. For example, assume a user wishes to move the database application mentioned above from one server system to another. In such a case, the management system may be configured to communicate with the SMC hosting the database application in order to request a BIOS profile from the BIOS. In response, the BIOS may generate the profile by translating the actual BIOS settings on the server into a BIOS profile consistent with the normalized form. Subsequently, the resulting normalized BIOS profile may be sent to a second server system (i.e., to the system to which the database application is being moved), which translates the BIOS profile into the actual BIOS settings appropriate for the second server. Thus, embodiments described herein allow a user to move a BIOS configuration used for an application hosted on one server, even when the application is moved from a system having one computing hardware architecture to a system having a different architecture.

The following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas have not been described in detail.

Additionally, a particular embodiment is described using a management system configured to remotely manage BIOS parameters via and to provide virtualized BIOS configuration profiles for computing systems within a data center. Further, this particular embodiment is described using a normalized BIOS definition composed using an example XML grammar. Of course, one of ordinary skill in the art will recognize that embodiments described herein may be used to manage BIOS settings for a broad variety of computing systems (e.g., server computing systems, desktop computing systems, computing appliances) whether such systems are present within a data center or otherwise, and further, that embodiments described herein may be adapted for other computing platforms configured with a BIOS and SMC (e.g., a routing or switching appliance) using a broad variety of data formats, protocols, and/or specifications. Accordingly, references to this particular example embodiment are included to be illustrative and not limiting.

FIG. 1 is a block diagram illustrating a management system 105 configured to manage a BIOS 130 on a server system 120 using normalized BIOS definition 115, according to certain embodiments of the present disclosure. The computer systems shown in computing environment 100 are included to be representative of existing computer systems, e.g., desktop computers, server computers, blade systems housed in a blade chassis or other rack mounted servers, and the like. The computing environment 100 illustrated in FIG. 1, however, is merely an example of one computing environment. As noted above, embodiments described herein may be adapted for use in a variety of computing environments. Further, the software applications described herein are not limited to any currently existing computing environment or programming language and may be adapted to take advantage of new computing systems as they become available.

As shown, the computing environment 100 includes a management system 105, which itself includes a systems management function (SMF) component 110, and a normalized BIOS definition 115. The server system 120 includes a server management controller (SMC) 125 and a BIOS 130. In one embodiment, the SMF component 110 provides a software tool configured to communicate with the SMC 125 on the server computing system 120. For example, the server system 120 may communicate with the SMC 125 using messages composed according to the IPMI specification. In such a case, SMC 125 is a baseboard management controller (BMC). As is known, IPMI, short for "Intelligent Platform Management Interface" generally refers to monitoring, system control and communication interfaces implemented directly in platform management hardware and firmware (e.g., the hardware and firmware of server system 120). The SMF component 110 may communicate with IPMI 135 and the SMC 125 over a network 102. The network 102 may be a local area network connecting management system 105 and server system 120 at a single facility, but may also be a larger network such as the internet. In the latter case, network 102 allows SMF component 110 to communicate with the SMC 125 from virtually any location.

In one embodiment, the SMF component 110 communicates with the SMC 125 in order to send (or receive) one or more normalized BIOS parameter settings. Such communication may include both an indication of one (or more) normalized BIOS parameters along with a value or setting for each BIOS parameter. Additionally, the normalized BIOS parameter settings may be composed according to the normalized BIOS definition 115. For example, the normalized BIOS definition 115 may provide an XML grammar for describing BIOS settings. Doing so allows the SMF component 110 and SMC 125 to exchange BIOS parameter settings as markup language documents. This approach is further illustrated in FIG. 6, which shows a list 600 of normalized BIOS parameters composed using an exemplary XML grammar. As shown, the list 600 provides a portion of an XML document that includes a collection of individual BIOS parameters 605 nested within an XML element named <bios-params>. The individual BIOS parameters 605 included in the <bios-params> element may be used to specify a broad variety of BIOS settings. In this particular example, the individual BIOS parameters 605 may be used to specify that a BIOS setting should be "enabled" or "disabled" (as shown for normalized BIOS parameters 610 and 630), used to set a BIOS parameter to one of multiple predefined values (such as "Maximum Performance" shown for normalized BIOS parameter 615), or to set a BIOS parameter to a specified number, character or string (as shown for normalized BIOS parameters 620, 625 and 635). Of course, one of ordinary skill in the art will recognize that other markup language grammars (and markup languages or data description formats) may be used to specify the normalized BIOS parameters.

Returning to FIG. 1, in one embodiment, the SMC 125 may be configured to receive a message from the SMF component 110 indicating that a BIOS parameter should be updated. The particular BIOS parameter may be specified using the normalized BIOS definition 115 (e.g., using the one of the sub-elements of the <bios-params> element shown in FIG. 6). In such a case, the SMC 125 may pass the received message to the BIOS 130, which translates the normalized BIOS parameter and determines a corresponding actual BIOS parameter setting for that system. Once determined, the BIOS settings are updated accordingly. The translation may be done using a mapping specific to the hardware on which the BIOS 130 is running. Thereafter, when server system 120 is rebooted, the updated BIOS parameters are applied or otherwise take effect. In addition to setting individual BIOS parameters, the SMF component 110 may transmit a markup language document which includes a complete collection of normalized BIOS parameter settings (i.e., a BIOS profile) used to update the actual BIOS settings stored by BIOS 130.

Similarly, the SMC 125 may interact with the BIOS 130 to request (or transmit) a BIOS profile composed according to the normalized BIOS definition 115. The BIOS profile may provide the then current setting for the BIOS parameters of BIOS 130 expressed as a markup language document composed according to the normalized BIOS definition 115. In one embodiment, the SMC 125 may transmit such a BIOS profile to the SMF component 110. Doing so allows the BIOS 130 to be moved from server system 120 to a target computing platform, even when the target platform does not have the same BIOS 130 or underlying hardware architecture as the server system 120, or even a connection between the server system 120 or the target platform. Of course, the SMF component 110 may request the SMC 125 send a then current value of individual BIOS parameters in a similar manner.

Figure 2:
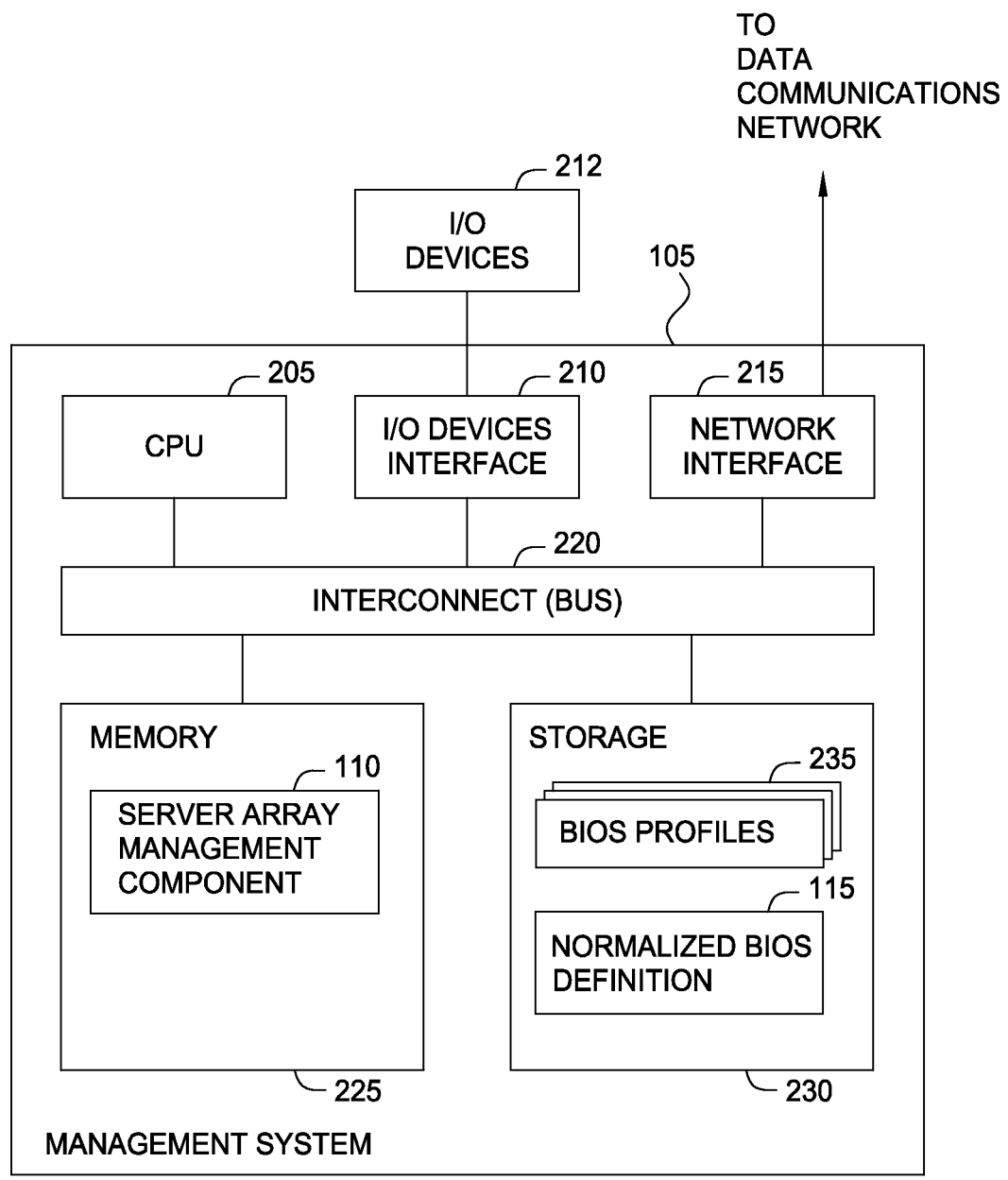
FIG. 2 is a more detailed view of the management computing system of FIG. 1, according to certain embodiments of the present disclosure.

FIG. 2 is a more detailed view of the management computing system 105 of FIG. 1, according to certain embodiments of the present disclosure. As shown, the management system 105 includes, without limitation, a central processing unit (CPU) 205, a network interface 215, an interconnect 220, a memory 225, and storage 230. The computing system 105 may also include an I/O devices interface 210 connecting I/O devices 212 (e.g., keyboard, display and mouse devices) to the computing system 105.

The CPU 205 generally retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215 and memory 225. CPU 205 is included to be representative of a single CPU, multiple CPUs, a single CPU having multiple processing cores, and the like. And the memory 225 is generally included to be representative of a random access memory. Storage 230, such as a hard disk drive or flash memory storage drive, may store non-volatile data.

Illustratively, the memory 225 includes the SMF component 110. As noted above, the SMF component 110 provides a software application which allows a user to manage the BIOS settings on a remote computing system using the normalized BIOS definition 115 and BIOS profiles 235. In one embodiment, BIOS settings may be updated on a remote server and a BIOS profile 235 may be retrieved from a remote computing system as described above.

Additionally however, a BIOS profile 235 may be created for a particular software application to be deployed on a server, e.g., a BIOS profile used to optimize a physical computing system used as a database server, an application server, web-a server, a virtualization server, or other application specific context. More generally, BIOS profile 235 may be associated with (or referenced by) a profile for a given application or application stack. In one embodiment, an administrator may create a BIOS profile 235 and associate it with a particular software application or particular hardware architecture. Doing so allows the SMF component 110 to be used to easily configure the computing servers in a data center with a specified server "personality." For example, in some cases, a software application or system configuration may require (or be optimized using) a particular set of BIOS parameters. In such a case, rather than requiring an administrator to interact with a server and BIOS screens at a server directly, a server may be configured using the appropriate BIOS profile 235 as well as the associated application load. This approach creates an essentially stateless computing environment, where the underlying hardware can be made transparent to the operating system or applications that run over it. The stateless computing environment allows an operating system or application to be moved from one server to another, i.e., allows the configuration of a server be changed very easily as the server "personality" may be applied to new systems or moved from one system to another.

Further, as the BIOS profile 235 is composed using the normalized BIOS definition 110, the BIOS profile 235 corresponding to a given an application can be simply pushed out to a server system—regardless of the actual hardware configuration, allowing the BIOS profiles for servers to be moved from one physical server system, as well as allows the BIOS settings on a given server system to be updated, modified, or recycled remotely. Once received, the SMC on that server system is configured to apply the BIOS settings to the BIOS on that server.

Figure 3:
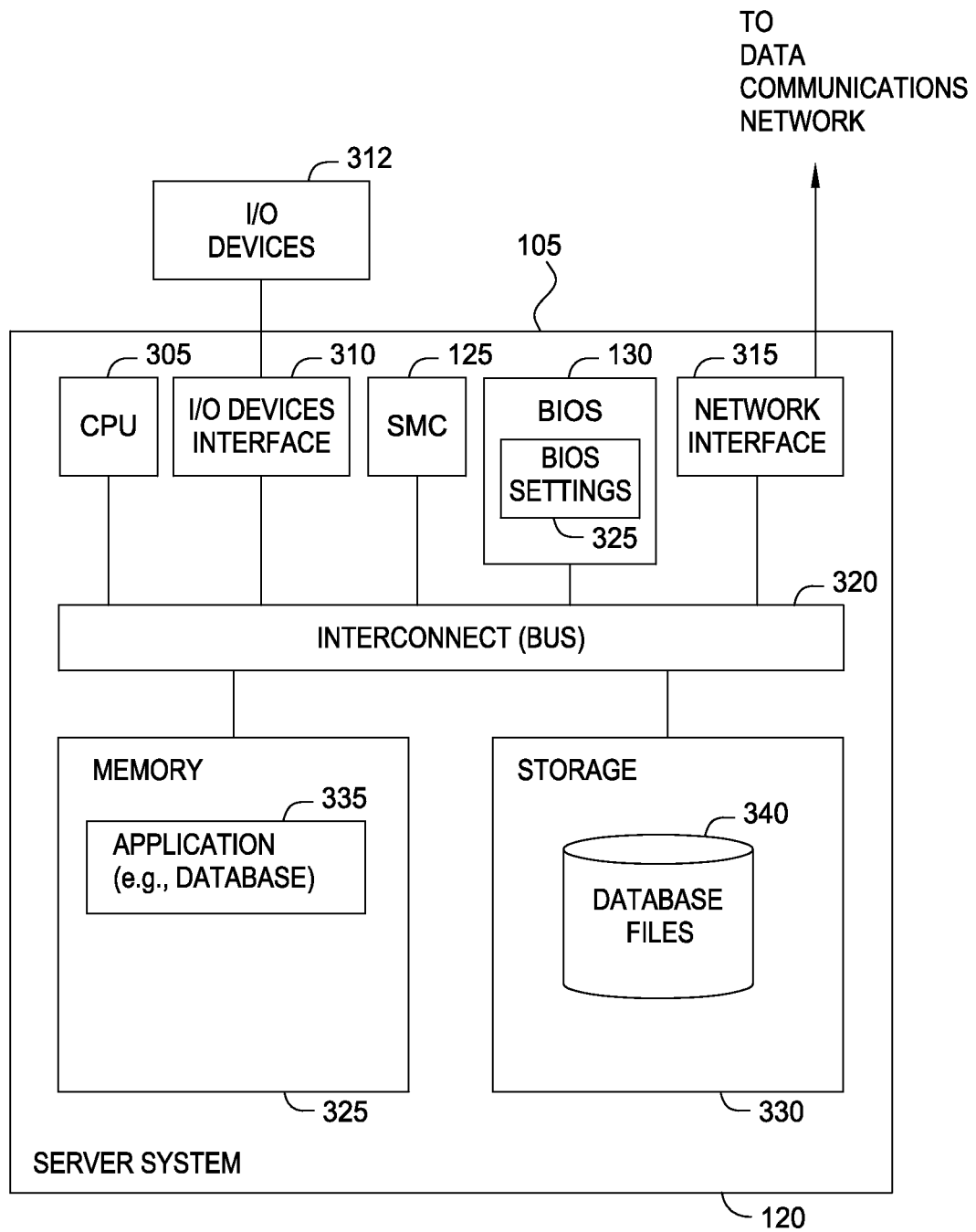
FIG. 3 is a more detailed view of the server computing system of FIG. 1, according to certain embodiments of the present disclosure.

FIG. 3 is a more detailed view of the server computing system 120 of FIG. 1, according to one embodiment described herein. As shown, server computing system 120 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display and mouse devices) to the server computing system 120.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305 and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 102. Although shown as a single unit, the storage 330 may be a combination of fixed and/or removable storage devices, such as fixed disc drives, floppy disc drives, tape drives, removable memory cards, optical storage, network attached storage (NAS), or a storage area-network (SAN).

As shown, server 120 may include the server management controller (SMC) 125 and the BIOS 130. As noted above, the SMC 125 may be configured to communicate with the SMF component 110 running on the management server 105 to change, update and report on BIOS settings 245 for BIOS parameters in BIOS 130. Illustratively, server system 120 is shown having been configured with a server "personality" of a database server. Accordingly, the memory 325 includes a database application 335 and storage 330 includes database files 340.

Figure 4:
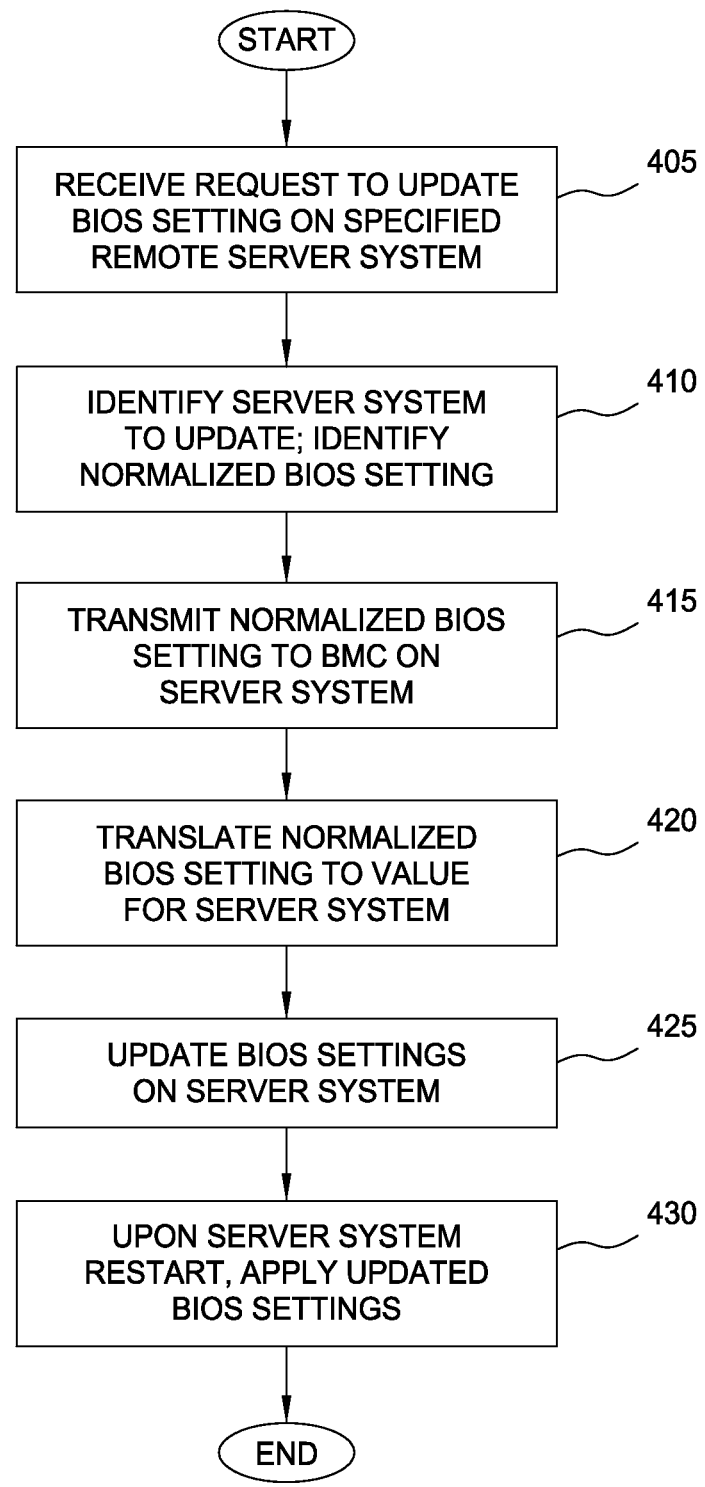
FIG. 4 illustrates a method for managing BIOS parameters, according to certain embodiments of the present disclosure.

FIG. 4 illustrates a method 400 for remote management of BIOS parameters, according to certain embodiments of the present disclosure. As shown, the method 400 begins at step 405, where the SMF component 110 receives a request to update one or more BIOS parameters in the BIOS of a specified, remote sever (e.g., server system 120). At step 410, the SMF component 110 identifies the server system to be updated as well as the normalized BIOS parameter (or parameters) to be applied to the BIOS on the remote server system. In one embodiment, the request may include an indication of one or more normalized BIOS parameters along with a BIOS setting to apply to each parameter. As noted above, the normalized BIOS parameters may be specified using a markup language grammar such as XML or using other data formats.

At step 415, the SMF component 110 transmits the normalized BIOS setting to the remove server system specified in the request. For example, the message may be sent using an IPMI interface to the server management controller (SMC) on the remote server system. Once received, at step 420, the BIOS on the specified system translates the normalized BIOS setting to a value appropriate for the actual architecture and BIOS present on that server system. That is, the BIOS translates the normalized BIOS parameter to an actual BIOS setting that can be stored in the BIOS on the sever system. At step 425, the BIOS updates the BIOS settings on the server system. And, at step 430 when the server is restarted, the updated BIOS settings are applied or otherwise take effect.

Note, while method 400 illustrates an approach for using the SMF component 110 to receive an update for the BIOS on a remote server, a similar approach may be used to obtain the then current settings for one or more BIOS parameters on the remote server. In such a case, the request received at step 405 may include an indication of the BIOS parameters to be returned by the remote server system. This information is then transmitted to the remote server. In response, the SMC on the remote server may pass the request to the BIOS which determines a then current setting for each requested BIOS parameter as well as translates them into a corresponding set of normalized BIOS settings, based on the normalized BIOS definition. That is, the BIOS generates a BIOS profile composed according to the normalized BIOS definition using the actual BIOS settings on the sever system to (e.g., by generating an XML document).

Figure 5:
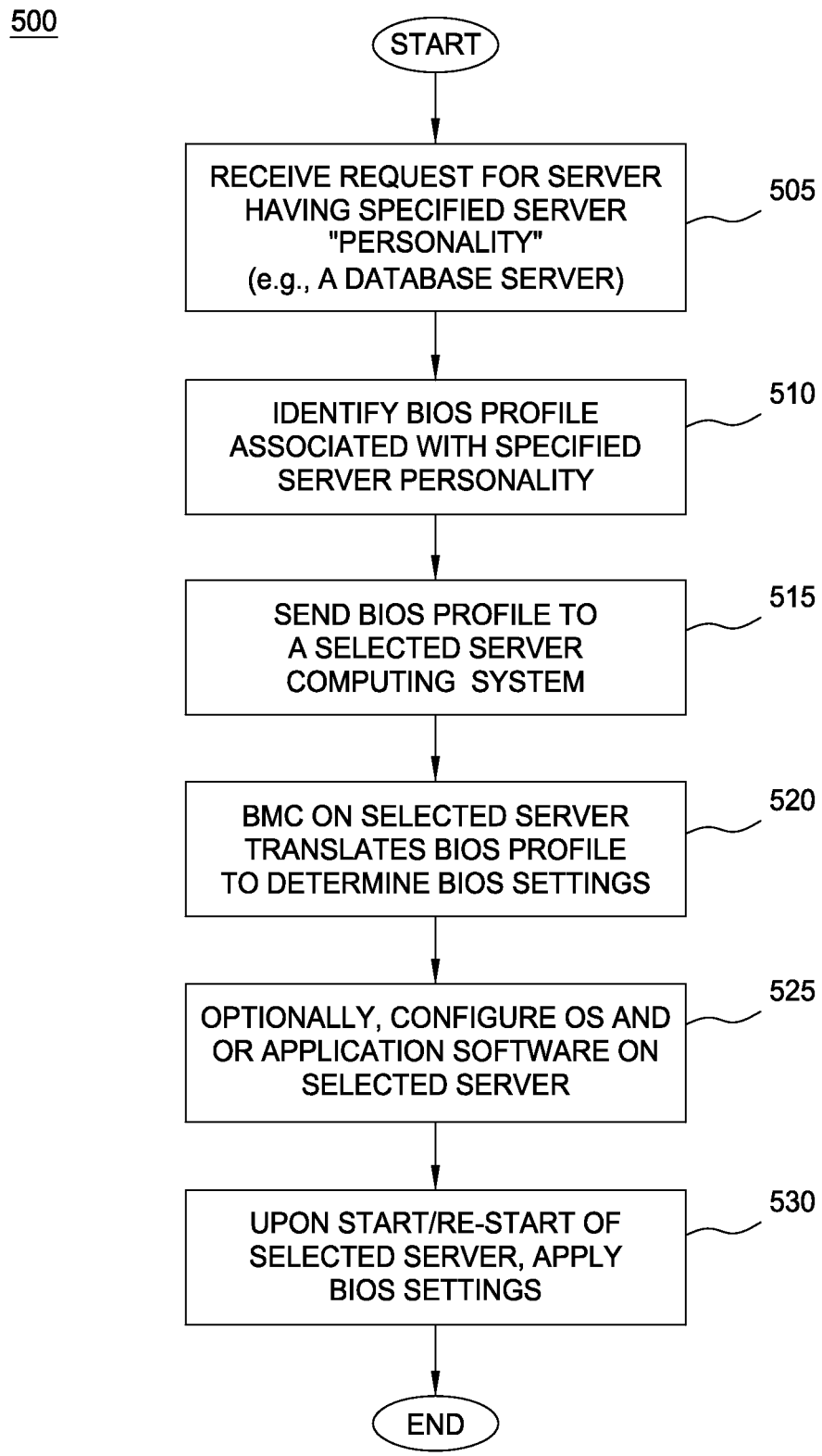
FIG. 5 illustrates a method for BIOS parameter virtualization via BIOS configuration profiles, according to certain embodiments of the present disclosure.

FIG. 5 illustrates a method 500 for BIOS parameter virtualization via BIOS configuration profiles, according to certain embodiments of the present disclosure. As shown, the method 500 begins at step 505, where the SMF component 110 receives a request to configure a server with a specified server "personality." As described above, a server "personality" generally refers to a computing server configured for a particular application (e.g., a database application), application stack, or for a particular set of underlying software. Further, a server "personality" profile may also include (or reference) a BIOS profile (e.g., BIOS profile 235) specifying a set of normalized BIOS settings needed by (or at least an optimized for) the server to execute the application.

At step 510, the SMF component 110 identifies the BIOS profile associated with the specified server "personality." And at step 515, the SMF component 110 transmits that BIOS profile to a server computing system. For example, assume a user requests BIOS on a computer system be configured for a "personality" profile associated with a database server. In such a case, the SMF component 110 may identify an available computer system within the data center and send the BIOS profile associated with the "database" personality to the server management controller (SMC) on that server system.

Once received, at step 520, the BIOS on the server system translates the normalized BIOS setting to a value appropriate for the architecture and BIOS on the server system. That is, the BIOS determines the appropriate BIOS parameter settings for the server from the normalized settings specified for the server "personality." Optionally, at step 525, the server may be configured with an operating system, and/or application software. That is, in addition to configuring the BIOS using the BIOS profile, the SMF component 110 may be configured to install an operating system and/or application software matching the specified server "personality." At step 530 when the server is restarted, the updated BIOS settings are applied or otherwise take effect.

Note, while method 500 illustrates an approach for using the SMF component 110 to apply a BIOS profile to a server system, a similar approach may be used to obtain a BIOS profile based on the then current settings for one or more BIOS parameters on the server. Doing so may be useful for moving an application that depends on a particular BIOS configuration form one server to another. In such a case, the request received at step 505 may include an indication of the remote server from which to obtain a BIOS profile. The SMF component 110 then communicates with the SMC on the identified server system to request a BIOS profile. In response, the SMC on the remote server may request a BIOS profile from the then current BIOS settings on that system and transmit it back to the SMF component 110. In the case of moving an application from one computing system to another, the SMF component transmits the received BIOS profile to another system, which updates and applies the BIOS profile as described above.

In sum, embodiments described herein present a BIOS configured to generate a markup language object (e.g., file, document, etc.) that describes a variety of BIOS setup variables, and which allows the BIOS to pass the markup language object to a management system via SMC, as well as allows the BIOS to retrieve a normalized BIOS from the management system via SMC and apply the normalized BIOS settings. Advantageously, this allows a range of BIOS settings on a computing system to be configured at once, and also allows a user to include the BIOS configuration of a computing system when moving an application from one server system to another.

While the foregoing is directed to embodiments of the present disclosure, other and further embodiments of the disclosure may be devised without departing from the basic scope thereof, and the scope thereof is determined by the claims that follow.

What is claimed:

1. A method for setting a BIOS parameter on a remote computing system:
    abstracting, based on a normalized BIOS definition, a BIOS parameter setting to create a normalized BIOS parameter setting, wherein the BIOS parameter setting is not compatible with a BIOS of the remote computing system, wherein the normalized BIOS definition provides a grammar to create the normalized BIOS parameter setting based on the BIOS parameter setting;
    receiving, over a data communications network, the normalized BIOS parameter setting to be applied to the BIOS on the remote computing system;
    translating the normalized BIOS parameter setting into an actual BIOS parameter setting compatible with the BIOS on the remote computing system, wherein the actual BIOS parameter setting includes a value corresponding to the normalized BIOS parameter setting;
    storing the actual BIOS parameter setting in the BIOS on the remote computing system; and
    applying the actual BIOS parameter setting to the operation of the remote computing system by rebooting the remote computing system.

2. The method of claim 1, wherein the normalized BIOS parameter is received by a server management controller (SMC) via an intelligent platform management interface (IPMI) on the remote computing system.

3. The method of claim 2, wherein translating the normalized BIOS parameter setting into an actual BIOS parameter setting is based on a mapping specific to a hardware configuration of the remote computing system, wherein the value is translated from the normalized BIOS parameter setting, wherein the normalized BIOS parameter comprises one or more markup language elements describing the normalized BIOS parameter and a setting for the normalized BIOS parameter.

4. The method of claim 3, wherein the markup language is XML.

5. The method of claim 4, further comprising,
    receiving, from a requesting system and over the data communications network, a request for an indication of a BIOS parameter setting on the remote computing system;
    retrieving the requested BIOS parameter setting from the BIOS on the remote computing system, wherein the requested BIOS parameter is not compatible with the requesting system;
    translating the retrieved BIOS parameter setting into a second normalized BIOS parameter; and
    transmitting, in response to the request, the second normalized BIOS parameter to the requesting system.

6. A non-transitory computer-readable storage medium, containing a program, which, when executed on a processor, performs an operation for managing BIOS parameter settings on a remote computing system, the operation comprising:
    abstracting, based on a normalized BIOS definition, a BIOS parameter setting to create a normalized BIOS parameter setting, wherein the BIOS parameter setting is not compatible with a BIOS of the remote computing system, wherein the normalized BIOS definition provides a grammar to create the normalized BIOS parameter setting based on the BIOS parameter setting;
    receiving the normalized BIOS parameter setting to be applied to the remote computing system;
    transmitting, over a data communications network, the normalized BIOS parameter setting to the remote computing system, wherein the remote computing system is configured to:
        receive the normalized BIOS parameter setting,
        translate the normalized BIOS parameter setting into an actual BIOS parameter setting compatible with the BIOS on the remote computing system, wherein the actual BIOS parameter setting includes a value corresponding to the normalized BIOS parameter setting,
        store the actual BIOS parameter setting in the BIOS on the remote computing system, and
        apply the actual BIOS parameter setting to the operation of the remote computing system by rebooting the remote computing system.

7. The computer-readable storage medium of claim 6, wherein the normalized BIOS parameter is received by a server management controller (SMC) via an intelligent platform management interface (IPMI) on the remote computing system.

8. The computer-readable storage medium of claim 7, wherein translating the normalized BIOS parameter setting into an actual BIOS parameter setting is based on a mapping specific to a hardware configuration of the remote computing system, wherein the value is translated from the normalized BIOS parameter setting, wherein the normalized BIOS parameter comprises one or more markup language elements describing the normalized BIOS parameter and a setting for the normalized BIOS parameter.

9. The computer-readable storage medium of claim 8, wherein the markup language is XML.

10. The computer-readable storage medium of claim 9, wherein the operation further comprises:
receiving, from a requesting system, a request for an indication of a BIOS parameter setting on the remote computing system;
transmitting the request to the remote computing system over the data communications network, wherein the remote computing system is further configured to:
identify a then current value for the specified BIOS parameter, wherein the specified BIOS parameter is not compatible with the requesting system;
translate the then current value for the specified BIOS parameter into a second normalized BIOS parameter; and
transmit, in response to the request, the second normalized BIOS parameter to the requesting system.

11. A method for configuring a BIOS on a remote computing system, comprising:
receiving, over a data communications network, a BIOS profile, wherein the BIOS profile describes a plurality of normalized BIOS parameter settings to be applied to the BIOS on the remote computing system, wherein the normalized BIOS parameter settings are created based on a normalized BIOS definition, wherein the BIOS profile is selected from a plurality of BIOS profiles, each of the plurality of BIOS profiles associated with a respective one of a plurality of different software applications, wherein the normalized BIOS definition provides a grammar to create the normalized BIOS parameter setting based on the BIOS parameter setting;
translating each of the normalized BIOS parameter settings into a respective actual BIOS parameter setting compatible with the BIOS on the remote computing system;
storing the actual BIOS parameter settings in the BIOS on the remote computing system; and
applying the actual BIOS parameter settings to the operation of the remote computing system by rebooting the remote computing system.

12. The method of claim 11, wherein the plurality of BIOS parameter settings described by the BIOS profile are configured to optimize the remote computing system for executing the software application, wherein the method further comprises:
receiving the respective software application associated with the BIOS profile;
installing the respective software application on the remote computing system; and
executing the respective software application on the remote computing system.

13. The method of claim 12, wherein the BIOS profile is further associated with a hardware architecture of the remote computing system, and wherein the plurality of BIOS parameter settings described by the BIOS profile optimize a configuration of the hardware architecture.

14. The method of claim 13, wherein the BIOS profile is received by a server management controller (SMC) via an intelligent platform management interface (IPMI) on the remote computing system.

15. A computing system, comprising,
a processor;
a memory;
a BIOS having a plurality of BIOS parameters and respective BIOS settings, wherein the computing system is configured to perform an operation for managing the plurality of BIOS parameter settings, the operation comprising:
abstracting, based on a normalized BIOS definition, a BIOS parameter setting to create a normalized BIOS parameter setting, wherein the BIOS parameter setting is not compatible with a BIOS of the remote computing system, wherein the normalized BIOS definition provides a grammar to create the normalized BIOS parameter setting based on the BIOS parameter setting;
receiving, over a data communications network, the normalized BIOS parameter setting to be applied to one of the BIOS parameters;
translating the normalized BIOS parameter setting into a corresponding one of the plurality of BIOS parameters;
storing the corresponding BIOS parameter setting in the BIOS on the computing system; and
applying the actual BIOS parameter setting to the operation of the computing system by rebooting the computing system.

16. The computing system of claim 15, wherein the operation further comprises:
receiving, from a requesting system and over the data communications network, a request for an indication of the BIOS setting for one of the plurality of BIOS parameters;
retrieving the requested BIOS parameter setting from the BIOS, wherein the requested BIOS parameter is not compatible with the requesting system;
translating the retrieved BIOS parameter setting into a second normalized BIOS parameter; and
transmitting, in response to the request, the second normalized BIOS parameter to a requesting system.

17. The computing system of claim 16, wherein translating the normalized BIOS parameter setting into an actual BIOS parameter setting is based on a mapping specific to a hardware configuration of the remote computing system, wherein the value is translated from the normalized BIOS parameter setting, wherein the normalized BIOS parameter is received by a server management controller (SMC) via an intelligent platform management interface (IPMI) on the computing system.

* * * * *